(12) United States Patent
Faasse et al.

(10) Patent No.: US 12,468,863 B2
(45) Date of Patent: Nov. 11, 2025

(54) BMC PLATFORM OFFLOAD TO A REMOTE APPLICATION

(71) Applicant: Lenovo Enterprise Solutions (Singapore) Pte. Ltd., New Tech Park (SG)

(72) Inventors: Scott Faasse, Tomball, TX (US); Christopher L. Wood, Chapel Hill, NC (US); Clifton E. Kerr, Morrisville, NC (US); Keith Campbell, Cary, NC (US); Brian Fuchs, Raleigh, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 386 days.

(21) Appl. No.: 17/890,961

(22) Filed: Aug. 18, 2022

(65) Prior Publication Data

US 2024/0061964 A1   Feb. 22, 2024

(51) Int. Cl.
*G06F 21/85* (2013.01)
*G06F 21/57* (2013.01)

(52) U.S. Cl.
CPC ............ *G06F 21/85* (2013.01); *G06F 21/572* (2013.01)

(58) Field of Classification Search
CPC ................................ G06F 21/85; G06F 21/572
See application file for complete search history.

(56) References Cited

U.S. PATENT DOCUMENTS

| | | | |
|---|---|---|---|
| 2021/0365559 A1* | 11/2021 | Jayakumar | G06F 21/572 |
| 2022/0043909 A1* | 2/2022 | Straw | G06F 21/566 |
| 2022/0276876 A1* | 9/2022 | Drury | G06F 21/572 |
| 2023/0030576 A1* | 2/2023 | Vijayvargiya | G06F 21/604 |
| 2023/0229414 A1* | 7/2023 | Gore | G06F 8/65 |
| | | | 717/171 |

(Continued)

OTHER PUBLICATIONS

Siepert, "EMC2101 Fan Controller and Temperature sensor," Adafruit Learning System, Dec. 15, 2020, pp. 1-20.

(Continued)

*Primary Examiner* — Daniel B Potratz
(74) *Attorney, Agent, or Firm* — Kunzler Bean & Adamson; Bruce R. Needham (57) ABSTRACT

A secure control module for BMC platform offloading to a remote application includes a processor, a network interface, and a connector with data connections. The connector is configured to connect to one or more data connections of a motherboard of a host. The secure control module includes non-transitory computer readable storage media storing code executable by the processor to perform operations that include receiving management signals from the connector. The management signals include input related to controlling the host. The operations include transmitting the management signals over the network interface to a management application running on a remote server, and receiving, over the network interface, management information from the management application. At least a portion of the management information is in response to the management signals. The operations include transmitting the management information over the connector to the host on at least one of the one or more data connections.

16 Claims, 6 Drawing Sheets

(56) References Cited

U.S. PATENT DOCUMENTS

2023/0259627 A1* 8/2023 Santan ............... G06F 13/1642
                                                  726/26
2023/0334155 A1* 10/2023 Zhang ................ G06F 21/554
2023/0351019 A1* 11/2023 Paulraj ............... G06F 9/4401

OTHER PUBLICATIONS

Maeckes, "Fan etc on external i2c-controller," RepRap, posted Nov. 1, 2018, pp. 1-18.

* cited by examiner

BMC PLATFORM OFFLOAD TO A REMOTE APPLICATION

FIELD

The subject matter disclosed herein relates to a baseboard management controller ("BMC") and more particularly relates to a control module that offloads host management functions to an application on a remote server.

BACKGROUND

Hosts (e.g., host computers), which may also be called servers, compute nodes, etc., often include a BMC that allows remote management of the hosts. To modularize BMCs, a DC-SCM specification has been developed and updated that provides a standardized secure control module (e.g., DC-SCM) with a connector with standardized signals, buses, connections, etc. This standardized secure control module is configured to allow various vendors to compete and provide a DC-SCM-compliant secure control module that includes the various functions of a BMC and associated circuitry. However, each time functional requirements of a BMC change, a different secure control module is required.

BRIEF SUMMARY

A secure control module for BMC platform offloading to a remote application is disclosed. The secure control module includes a processor, a network interface, and a connector with a plurality of data connections. The connector is configured to connect to one or more data connections of a motherboard of a host. The secure control module includes non-transitory computer readable storage media storing code. The code is executable by the processor to perform operations that include receiving management signals from the connector. The management signals include input related to controlling the host. The operations include transmitting the management signals over the network interface to a management application running on a remote server, and receiving, over the network interface, management information from the management application. At least a portion of the management information is in response to the management signals. The operations include transmitting the management information over the connector to the host on at least one of the one or more data connections.

A method for BMC platform offloading to a remote application includes receiving management signals at a connector. The connector includes a plurality of data connections. The connector is configured to connect to one or more data connections of a motherboard of a host. The method includes transmitting the management signals over a network interface to a management application running on a remote server, and receiving, over the network interface, management information from the management application. At least a portion of the management information is in response to the management signals. The method includes transmitting the management information over the connector to the host on at least one of the one or more data connections.

A system for BMC platform offloading to a remote application includes a host with a motherboard, a secure control module with a processor, a network interface, and a connector on the motherboard with a plurality of data connections. The connector is configured to connect to one or more data connections of the motherboard. The secure control module includes non-transitory computer readable storage media storing code. The code is executable by the processor to perform operations that include receiving management signals from the connector. The management signals include input related to controlling the host. The operations include transmitting the management signals over the network interface to a management application running on a remote server, and receiving, over the network interface, management information from the management application. At least a portion of the management information is in response to the management signals. The operations include transmitting the management information over the connector to the host on at least one of the one or more data connections.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining L j software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing, which are non-transitory. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any non-transitory tangible medium that can contain or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" or "one of A, B or C" includes only A, only B or only C and excludes combinations of A, B and C.

A secure control module for BMC platform offloading to a remote application is disclosed. The secure control module includes a processor, a network interface, and a connector with a plurality of data connections. The connector is configured to connect to one or more data connections of a motherboard of a host. The secure control module includes non-transitory computer readable storage media storing code. The code is executable by the processor to perform operations that include receiving management signals from the connector. The management signals include input related to controlling the host. The operations include transmitting the management signals over the network interface to a management application running on a remote server, and receiving, over the network interface, management information from the management application. At least a portion of the management information is in response to the management signals. The operations include transmitting the management information over the connector to the host on at least one of the one or more data connections.

In some embodiments, the management application emulates functions of a BMC. In other embodiments, the connector is compliant with an industry standard specification for a BMC interface. In other embodiments, wherein the connector is a Datacenter-ready Secure Control Interface ("DC-SCI") and the DC-SCI is compliant with a DC-SCM specification. In other embodiments, the management signals include signals intended for a BMC. In other embodiments, the management signals are compliant with a DC-SCM specification. In other embodiments, the management application emulates functions of a BMC.

In some embodiments, the operations include one or more signal buffers configured to buffer the management signals and/or queue the management signals prior to transmitting the management signals to the management application, and/or buffer the management information and/or queue the management information prior to transmitting the management information to the host. In other embodiments, the management application includes a Basic Input/Output System ("BIOS") image for the host and/or a BMC image and, in response to management signals accessing the BIOS image and/or the BMC image, the operations include receiving management information from the BIOS image and/or the BMC image and transmitting the management information to the host over the connector.

In some embodiments, the one or more connections include one or more general-purpose input/output ("GPIO") connections, an inter-integrated circuit ("I$^2$C" or "I2C") bus, a peripheral component interconnect express ("PCIe") bus, a serial peripheral interface ("SPI") bus, a universal serial bus ("USB"), a Joint Test Action Group ("JTAG") connection, an I3C bus, a network controller sideband interface ("NCSI") bus, and/or a universal asynchronous receiver-transmitter ("UART") connection. In other embodiments, the connector includes the network interface. In other embodiments, the connector includes a card slot, printed circuit board ("PCB") traces, and/or wired connections.

A method for BMC platform offloading to a remote application includes receiving management signals at a connector. The connector includes a plurality of data connections. The connector is configured to connect to one or more data connections of a motherboard of a host. The method includes transmitting the management signals over a network interface to a management application running on a remote server, and receiving, over the network interface, management information from the management application. At least a portion of the management information is in response to the management signals. The method includes transmitting the management information over the connector to the host on at least one of the one or more data connections.

In some embodiments, the management application emulates functions of a BMC. In other embodiments, the management signals include signals intended for a BMC and the management signals are compliant with an industry standard BMC interface specification. In other embodiments, the method includes buffering the management signals and/or queuing the management signals prior to transmitting the management signals to the management application, and/or buffering the management information and/or queuing the management information prior to transmitting the management information to the host. In other embodiments, the management application includes a BIOS image for the host and/or a BMC image and, in response to management signals accessing the BIOS image and/or the BMC image, the method includes receiving management information from the BIOS image and/or the BMC image and transmitting the management information to the host over the connector.

A system for BMC platform offloading to a remote application includes a host with a motherboard, a secure control module with a processor, a network interface, and a connector on the motherboard with a plurality of data connections. The connector is configured to connect to one or more data connections of the motherboard. The secure control module includes non-transitory computer readable storage media storing code. The code is executable by the processor to perform operations that include receiving management signals from the connector. The management signals include input related to controlling the host. The operations include transmitting the management signals over the network interface to a management application running on a remote server, and receiving, over the network interface, management information from the management application. At least a portion of the management information is in response to the management signals. The operations include transmitting the management information over the connector to the host on at least one of the one or more data connections.

In some embodiments, the management application emulates functions of a BMC. In other embodiments, the management signals include signals intended for a BMC and the management signals are compliant with a DC-SCM specification.

Figure 1:
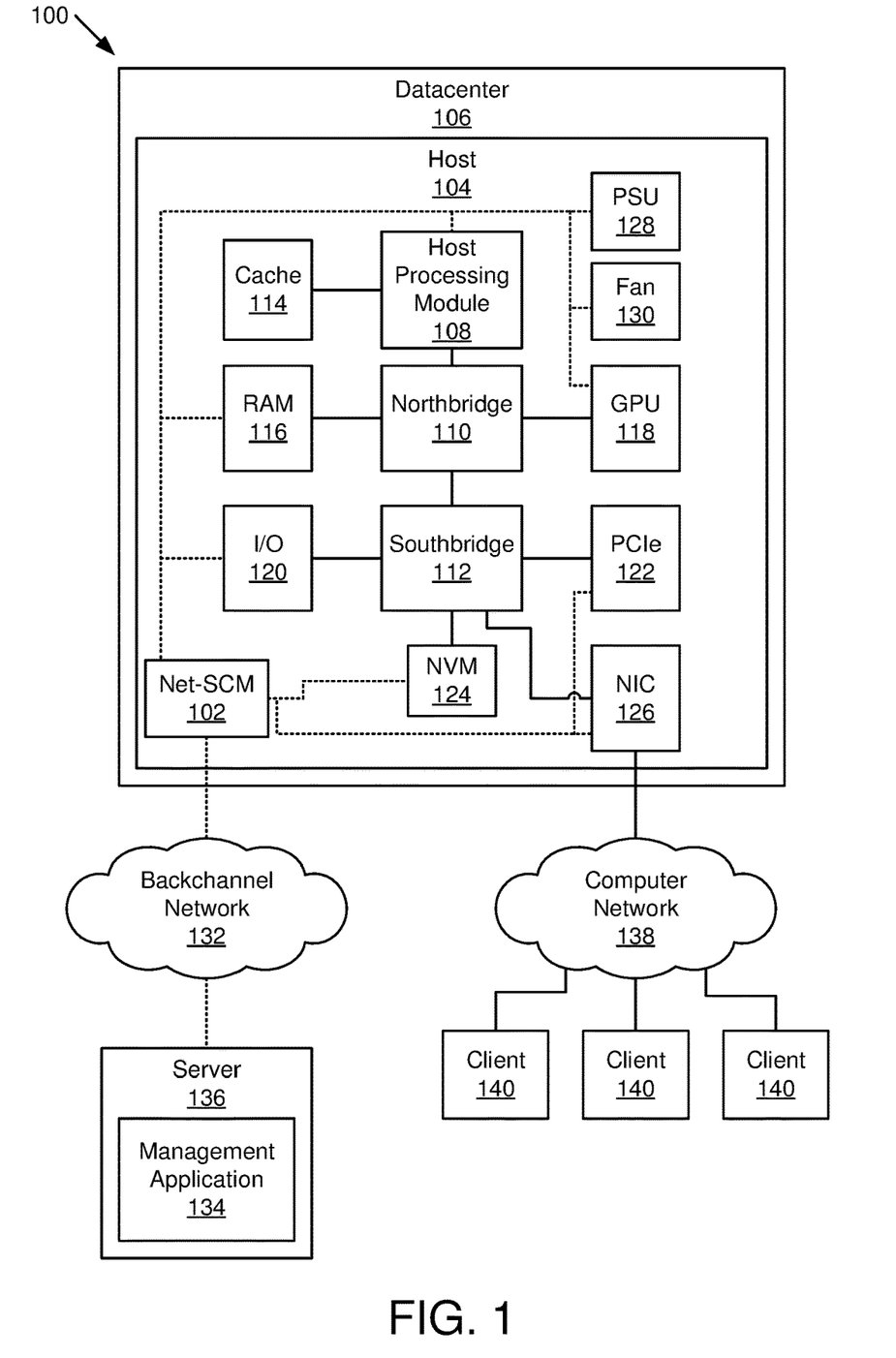
FIG. 1 is a schematic block diagram illustrating a system for BMC platform offloading to a remote application, according to various embodiments.

FIG. 1 is a schematic block diagram illustrating a system 100 for BMC platform offloading to a remote application, according to various embodiments. The system 100 includes a Net-SCM 102 in a host 104 of a datacenter 106. The Net-SCM is a network secure control module that differs from a Datacenter Secure Control Module ("DC-SCM") that is compliant with the DC-SCM 2.0 standard or similar standard. The Net-SCM offloads BMC functions to a remote management application 134 on a server that is remote from the host 104.

A problem with current BMCs or secure control modules that are DC-SCM compliant (e.g., "a DC-SCM") is that when functional requirements change, a new hardware device is often required. While the DC-SCM specifications have provided a mechanism to allow vendors to have a common interface so that different vendors can provide a DC-SCM, this modularity does not address the fact that new hardware devices are often required.

The Net-SCM 102 is a device that replaces a BMC and associated circuitry or a DC-SCM, but offloads BMC functionality to another server 136 so that changes to accommodate new or different functionality of a BMC/DC-SCM are able to be implemented through software changes. The Net-SCM 102 receives management signals from the host 104 and then transmits the management signals to the management application 134 for processing. The management application 134 provides a response in the form of management information back to the Net-SCM 102, which then transmits the management information back to the host 104. Thus, the Net-SCM 102 is a pass-through device. As long as the Net-SCM 102 is designed with enough capacity to handle signals from the host 104 to the management application 134 and from the management application 134 to the host 104, the Net-SCM 102 does not need to change as BMC functionality of the management application 134 changes. The Net-SCM 102 is described in more detail with respect to the secure control modules 300, 400 of FIGS. 3 and 4.

The host 104 is typical of compute nodes, servers, and other devices with a BMC or DC-SCM that provides management functions. The host 104 includes a host processing module 108, which is a processor, a central processing unit ("CPU"), or the like. The host processing module 108 may also be called an HPM, which is typical in DC-SCM documentation. The host 104 may include typical components, such as a northbridge 110, southbridge 112, cache 114, and random-access memory ("RAM") 116, which may be the form of dual inline memory modules ("DIMMs"). The host 104 may include a graphics processing unit ("GPU") 118 and input/output ("I/O") devices 120. The host 104 may include a Peripheral Component Interconnect Express ("PCIe") bus 122, non-volatile memory ("NVM") 124, and a network interface card ("NIC") 126. The host 104 may also include a power supply unit 128 and fan 130. Some or all of the components 106-130 of the host 104 are traditionally connected to and/or controlled by a BMC and/or and thus may be controlled and connected to the Net-SCM 102.

In the system 100 of FIG. 1, the Net-SCM 102 is connected to the components 106-130 and server 136 with the management application 134 via a backchannel network 132, which is depicted as dashed lines. The backchannel network 132, in some embodiments, is separate from a computer network 138 connecting clients 140 to the host 104. In other embodiments, the Net-SCM 102 is connected to the server 136 and management application 134 over the same computer network 138 as the clients 140, but is connected using a secure protocol. In some embodiments, the NIC 126 includes a port that connects the Net-SCM 102 with the server 136 and management application 134. Note that the architecture of the depicted host 104 is merely intended to represent a computing device that is typically controlled via a BMC or DC-SCM and may be controlled by a Net-SCM 102. The Net-SCM 102 may be included with any computing device that traditionally includes a BMC and/or DC-SCM.

The backchannel network 132 and computer network 138 each may include a LAN, a WAN, a fiber channel network, a cellular network, a wireless connection, etc., or any combination thereof. The wireless connection may be a mobile telephone network. The backchannel network 132, in some embodiments, runs using a management network protocol, such as Redfish, Intelligent Platform Management Interface ("IPMI"), Simple Network Management Protocol ("SNMP"), Alert Standard Format ("ASF"), Hypertext Transfer Protocol ("HTTP"), Hypertext Transfer Protocol Secure ("HTTPS"), or the like.

The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application.

While the management application 134 and server 136 are depicted outside the datacenter 106, in some embodiments, the management application 134 and server 136 are within the datacenter 106. In other embodiments, the management application 134 and server 136 are in a cloud computing environment. In other embodiments, the management application 134 and server 136 are at a vendor location where the vendor leases hosts 104 that are in the datacenter 106. One of skill in the art will recognize other locations for the management application 134 and server 136.

The management application 134, in various embodiments, emulates functions of a BMC, DC-SCM, or similar BMC that may be compliant with an industry standard specification. In various examples, the management application 134 includes functions such as software deployment, monitoring temperature, speed of the fan 130, utilization of the HPM 108, RAM 116, NVM 124, etc., and the like. In some embodiments, the management application 134 is able to control the host 104 when the host is in an off state and is able to boot the host 104. In other embodiments, the management application 134 is able to manage versions of a Basic Input/Output System ("BIOS") for the host 104 and versions of a BMC software. The management application 134 is discussed in more detail below with respect to the secure control modules 300, 400 of FIGS. 3 and 4.

Figure 2:
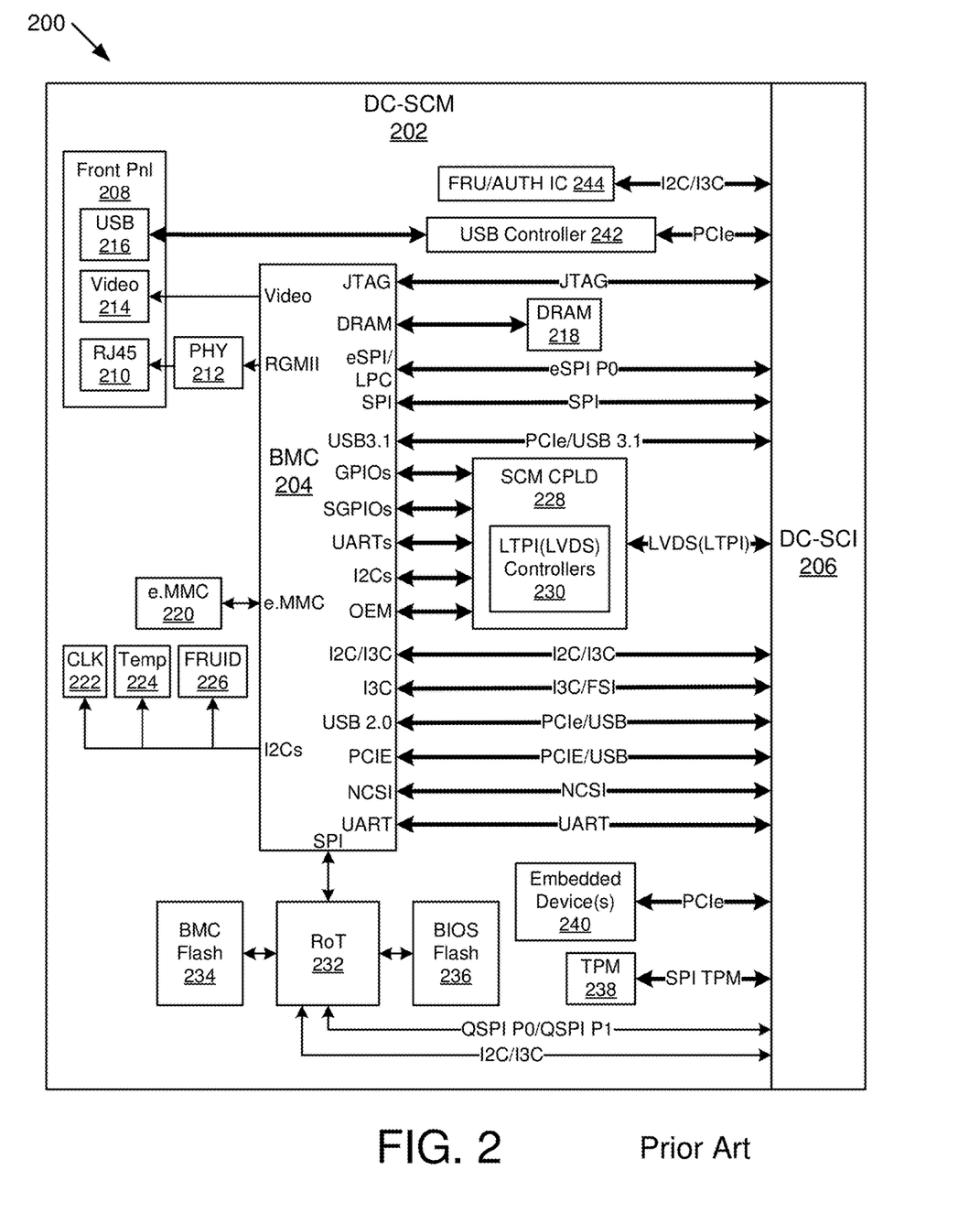
FIG. 2 is a schematic block diagram illustrating an embodiment of a DC-SCM architecture.

FIG. 2 is a schematic block diagram illustrating an embodiment 200 of a DC-SCM 202. The DC-SCM 202 depicted in FIG. 2 is representative of architectures of secure control modules that are compliant with a DC-SCM specification, such as DC-SCM 2.0 or other version. The DC-SCM 202 is intended to include management functions in a standard format so that a BMC 204 and other components have a standard connector, which is depicted as a Datacenter-ready Secure Control Interface ("DC-SCI") 206. While a DC-SCM 202 and associated DC-SCI 206 are described, other circuits that include a BMC and have an industry standard interface are also contemplated herein.

In some embodiments, the DC-SCM 202 includes a front panel 208 that includes an RJ-45 jack 210 connected to the BMC 204 through a physical layer ("PHY") 212. The front panel 208 may also include a video connection 214 for an electronic display, such as a display port ("DP"), a mini-DP, or similar connection. The front panel 208 may also include a universal serial bus ("USB") port connected to a USB controller 242. The front panel 208 provides communication and display functions for the DC-SCM 202. Typically, a BMC 204 includes RAM, such as dynamic RAM ("DRAM") 218 and non-volatile memory ("NVM"), such as Embedded Multi-Media Card ("e.MMC") 220 or a Solid-State Drive ("SSD"), which are often external to the BMC 204. The DC-SCM 202, in some embodiments, also includes a clock 222, a temperature sensor 224, and a Field Replaceable Unit Identification ("FRUID") chip 226 external to the BMC 204 that interface with the BMC 204.

In some embodiments, the DC-SCM 202 includes a secure control module complex programmable logic device ("SCM-CPLD"), or similar device such as an FPGA, which may include Low-voltage differential signaling Tunneling Protocol and Interface ("LTPI (LVDS)") controllers 230, which provides connection to various busses, such as general-purposes input/output ("GPIO"), serial GPIO ("SGPIO"), universal asynchronous receiver-transmitter ("UART"), Inter-Integrated Circuit ("I2C" or "I²C"), or I3C busses with an interface to LTPI (LVDS) signals. The DC-SCM 202 also includes other interfaces to the BMC 204, such as I2C, I3C, I3C with a fast serial interface ("I3C FSI"), peripheral component interconnect express ("PCIe"), USB 2.0, UART, one or more general-purpose input/output ("GPIO") connections, a serial peripheral interface ("SPI") connection, a Quad SPI ("QSPI") connection, a USB of various forms, and/or a Joint Test Action Group ("JTAG") connection. The DC-SCM 202 also supports Network Controller-Sideband Interface ("NC-SI" or "NCSI"), which allows the BMC 204 to connect to a network controller through the NIC 126.

The DC-SCM 202 may also include a Root-of-Trust ("RoT") security processor 232, which connects to BMC flash memory 234 with an image of BMC software and to BIOS flash memory 236 with image of the BIOS for the host 104. The RoT security processor 232 provides security and verification of the BMC and BIOS images. The DC-SCM 202 may also include a trusted platform module ("TPM") 238, which provides hardware-based security-related functions for the DC-SCM 202 and host 104. The DC-SCM 202 may also include embedded devices 240 with a PCIe connection. The DC-SCM 202 may also provide a field replaceable unit ("FRU") authentication integrate circuit ("AUTH IC") 242. The intent of the Net-SCM 102 is to replace various versions of the hardware of the DC-SCM 202 while maintaining a connector similar to the DC-SCI 206 to interface with DC-SCM-compliant hosts 104 and other computing devices.

Figure 3:
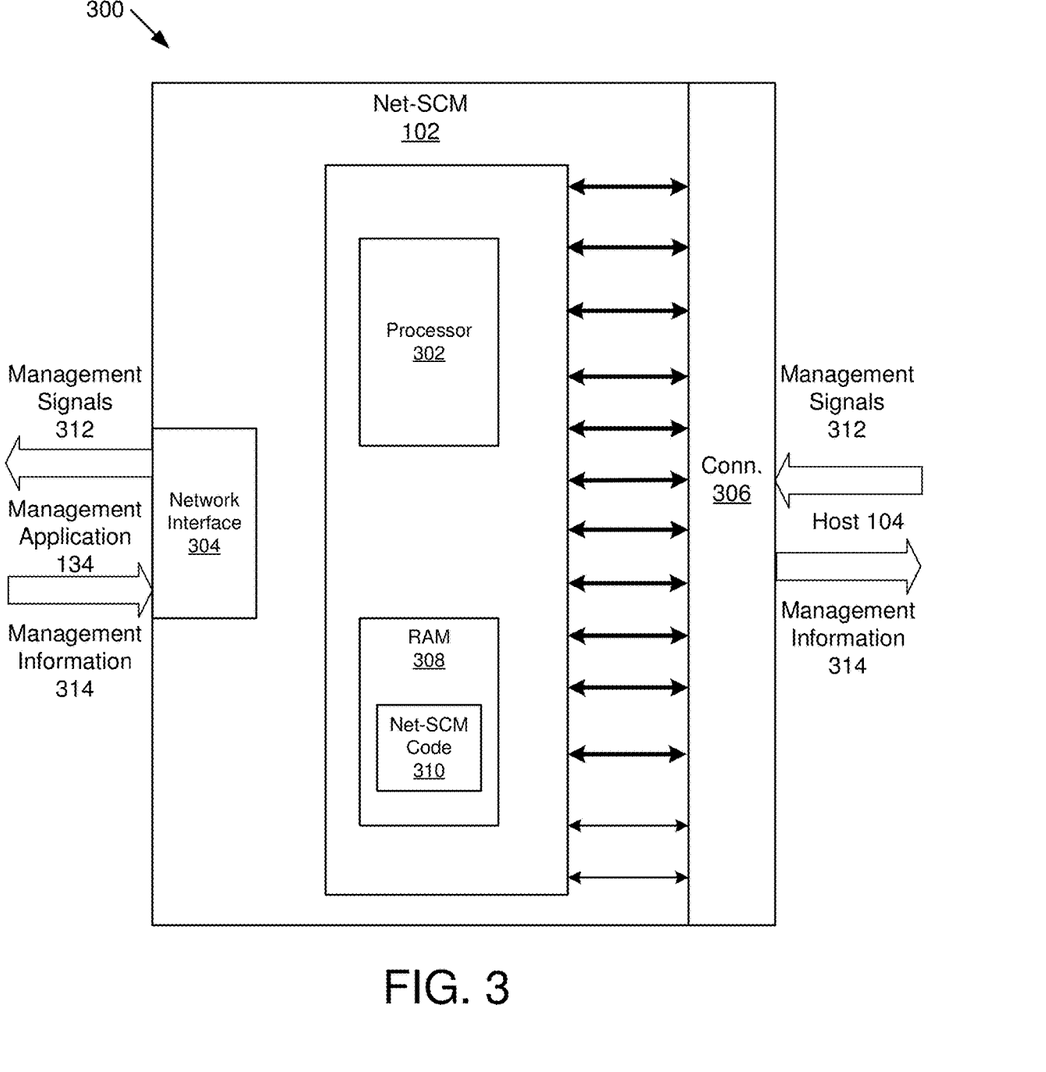
FIG. 3 is a schematic block diagram illustrating a secure control module for BMC platform offloading to a remote application, according to various embodiments.

FIG. 3 is a schematic block diagram illustrating a secure control module 300 for BMC platform offloading to a remote application, according to various embodiments. The secure control module 300 includes a Net-SCM 102 with a processor 302, a network interface 304, a connector 306, and RAM 308, which are described below.

The processor 302 is capable of managing receiving signals from the host 104 through the connector 306, transmitting signals to the management application 134 through the network interface 304, receiving signals from the management application 134 via the network interface 304, and then transmitting signals to the host 104 through the connector 306. The processor 302, in some embodiments, is capable of managing numerous signals, such as some or all of the signals going through a DC-SCM-compliant connector, such as the DC-SCI 206 along with resultant signals and other management signals 312 to and from the management application 134. In some embodiments, the processor 302 is capable of routing signals from the management application 134 an appropriate bus or connection of the connector 306.

In some embodiments, the processor 302 is capable of emulating a BMC and/or DC-SCM 202 in terms of volume of signals and speed of processing. In other embodiments, the processor 302 is capable of emulating a BMC and/or DC-SCM 202 at a speed capability of the management application 134, server 136, and/or backchannel network 132 or computer network 138 if signals from the Net-SCM 102 are going through the computer network 138. One of skill in the art will recognize processor requirements and capabilities for the processor 302 of the Net-SCM 102.

The network interface 304, in some embodiments, is a network interface card ("NIC"). In other embodiments, the network interface 304 is similar to the front panel 208 and includes an RJ-45 jack 210 that is part of a PHY 212 or includes a USB port 216 and USB controller 244, which provides a network connection to the Net-SCM 102. In other embodiments, the connector 306 includes the network interface 304 where the network interface 304 makes use of a NC—SI connection in the connector 306, which connects to the NIC 126 of the host 104 and signals between the Net-SCM 102 and the management application 134 go through the NIC 126 of the host 104. The network interface 304 is capable of handling volume of signals required for communications between the Net-SCM 102 and the management application 134.

The connector 306, in some embodiments, includes a plurality of data connections and the connector 306 is configured to connect to one or more data connections of a motherboard of the host processing module 108. The one or more connections on the motherboard connect to various components, such as the fan 130, the power supply unit 128, the HPM 108, RAM 116, a GPU 118, NVM 124, a NIC 126, and the like. In some embodiments, the connector 306 includes connections, buses, etc. of various protocols that are similar to connections, buses, etc. of a typical BMC of a computing device, such as the host 104. In other embodiments, the connector 306 includes connections, buses, etc. of various protocols that are compliant with a DC-SCM specification. In other embodiments, the connector 306 includes connections, buses, etc. similar to the DC-SCI 206.

In various embodiments, the Net-SCM 102 is able to be configured in the same forms as a DC-SCM 202. In some embodiments, the connector 306 is configured as a card slot and the Net-SCM 102 is configured to plug into the card slot, which may be appropriate for hosts 104 that have vertical space for a Net-SCM 102 mounted vertically. In other embodiments, the connector 306 is configured to connect to printed circuit board ("PCB") traces on the motherboard of the host 104. In other embodiments, some or all of the connections, busses, etc. on the connector 306 are wired connections. For example, one or more connections from the connector 306 may be wired connections to the fan 130, PSU 128, etc.

In some embodiments, the Net-SCM 102 includes non-transitory computer readable storage media storing code where the code is Net-SCM code 310, as depicted in FIG. 3. The Net-SCM code 310 is configured to be executable on the processor 302 to perform operations that include receiving management signals 312 from the connector 306. The Net-SCM code 310, in some embodiments, includes software modules for various functions. The management signals 312 include input related to controlling the host 104 and/or HPM 108. In some examples, the management signals 312 include requests or commands from the HPM 108 or other components of the host 104. In other embodiments, the management signals 312 include information from temperature sensors, fan speed signals from the fan 130, temperature information, power usage, efficiency, etc. from the PSU 128, utilization information from the GPU 118, RAM 116, cache 114, NVM 124, etc., and other typical signals received by a BMC and/or DC-SCM 202. In some embodiments, the management signals 312 are digital signals. In other embodiments, the management signals 312 include analog signals. One of skill in the art will recognize other signals and information received through the connector 306 from the host 104.

The Net-SCM code 310, in some embodiments, is configured to perform operations that include transmitting the management signals 312 over the network interface 304 to a management application 134 running on a remote server 136. Any analog management signals 312 are converted to digital signals prior to transmission to the management application 134. The remote server 136 is remote in terms of being separate from the host 104. The Net-SCM code 310, in some embodiments, is capable of transmitting all of the received management signals 312 to the management application 134.

In some embodiments, the Net-SCM code 310 is configured to perform operations that include receiving, over the network interface 304, management information 314 from the management application 134 where at least a portion of the management information 314 is in response to the management signals 312. For example, the management information 314 may include temperature information from the HPM 108 indicating a temperature rise. The management application 134 may then issue a command to increase speed of the fan 130 so the management information 314 includes a command to increase speed of the fan 130. The management application 134, in some embodiments, is capable of receiving and analyzing multiple management signals 312 and providing one or more commands and data as management information 314.

In some embodiments, the management application 134 is running in a virtual machine ("VM") of the server 136. In other embodiments, the management application 134 is running in a container on the server 136. In some embodiments, the management application 134 is running on a server 136 that is a bare metal server (e.g., not running a VM or container). In other embodiments, the management application 136 manages multiple hosts 104 through multiple Net-SCMs 102. The management application 134, in some embodiments, runs on a server 136 capable of supporting speed and capacity requirements of the management application 134 to properly emulate a BMC or DC-SCM.

In some examples, the management application 134 includes a BIOS image for the host 104 and/or a BMC image. Having the BIOS and BMC images on or accessible to the management application 134 allows for simple updates by just accessing a different image, overwriting an image, etc. In some embodiments, in response to management signals 312 accessing the BIOS image and/or the BMC image, the Net-SCM code 310 is configured to receive management information 314 from the BIOS image and/or the BMC image on the management application 134 and to transmit the management information 314 to the host 104 over the connector 306. The host 104 then uses the received BIOS image or BMC image as needed.

In some embodiments, the management information 314 includes commands, signals, instructions, etc. generated by the management application 134 that are not related to management signals 312 from the host 104. In some examples, the management application 134 responds to user input to generate appropriate management information 314 for the host 104. In some embodiments, the management application 134 includes a graphical-user interface ("GUI") that facilitates user interaction with the management application 134. In other embodiments, the GUI is available on a client that has access to the management application 134. The client, in some embodiments, is remote from the server 136 running the management application 134. The GUI, in some embodiments, includes security protocols similar to a management console accessing a BMC or DC-SCM 202. In other embodiments, the management information 314 includes commands, information, etc. generated by the management application 134 interacting with other applications, running routines, providing scheduled commands, etc.

In some embodiments, the Net-SCM code 310 is configured to perform operations that include transmitting the management information over the connector 306 to the host processing module 108 on at least one of the one or more data connections. In some embodiments, the Net-SCM code 310 is capable of causing the processor 302 to route the management information 314 to an appropriate component of the host 104, such as to the fan 130. In some embodiments, the Net-SCM code 310 includes functionality to receive certain management information 314 and then to divide the management information 314 into discrete commands. In other embodiments, the Net-SCM code 310 includes functionality to receive certain management information 314 and then to create or reformat management information 314 that includes one or more commands that are transmitted to the various components of the host 104. One of skill in the art will recognize other ways for the Net-SCM code 310 to transmit management information 314 to the host 104 over the connector 306.

While the secure control module 300 of FIG. 3 is described above as having a processor 302 and Net-SCM code 310 in non-volatile computer readable storage media, which may be RAM 308, in other embodiments, the secure control module 300 is implemented in other ways. In some embodiments, all or a portion of the secure control module 300 is implemented with a programmable hardware device, such as an FPGA and/or one or more hardware circuits. In some embodiments, the Net-SCM 102 is implemented with a VLSI or similar hardware.

In some embodiments, the Net-SCM 102 transmits the management signals 312 to the management application 134 using a security protocol, such as encryption, tunneling, or other security mechanism that ensures security of the transmitted management signals 312. In other embodiments, the Net-SCM 102 participates with the management application 134 to receive management information 314 over a secure connection. The backchannel network 132, in some embodiments, is separate from the computer network 138 for security. In addition, the management application 134 includes a GUI that requires a user identifier and a password for access. In addition, other security means may be used for secure access by a user, such as two-factor authentication.

Figure 4:
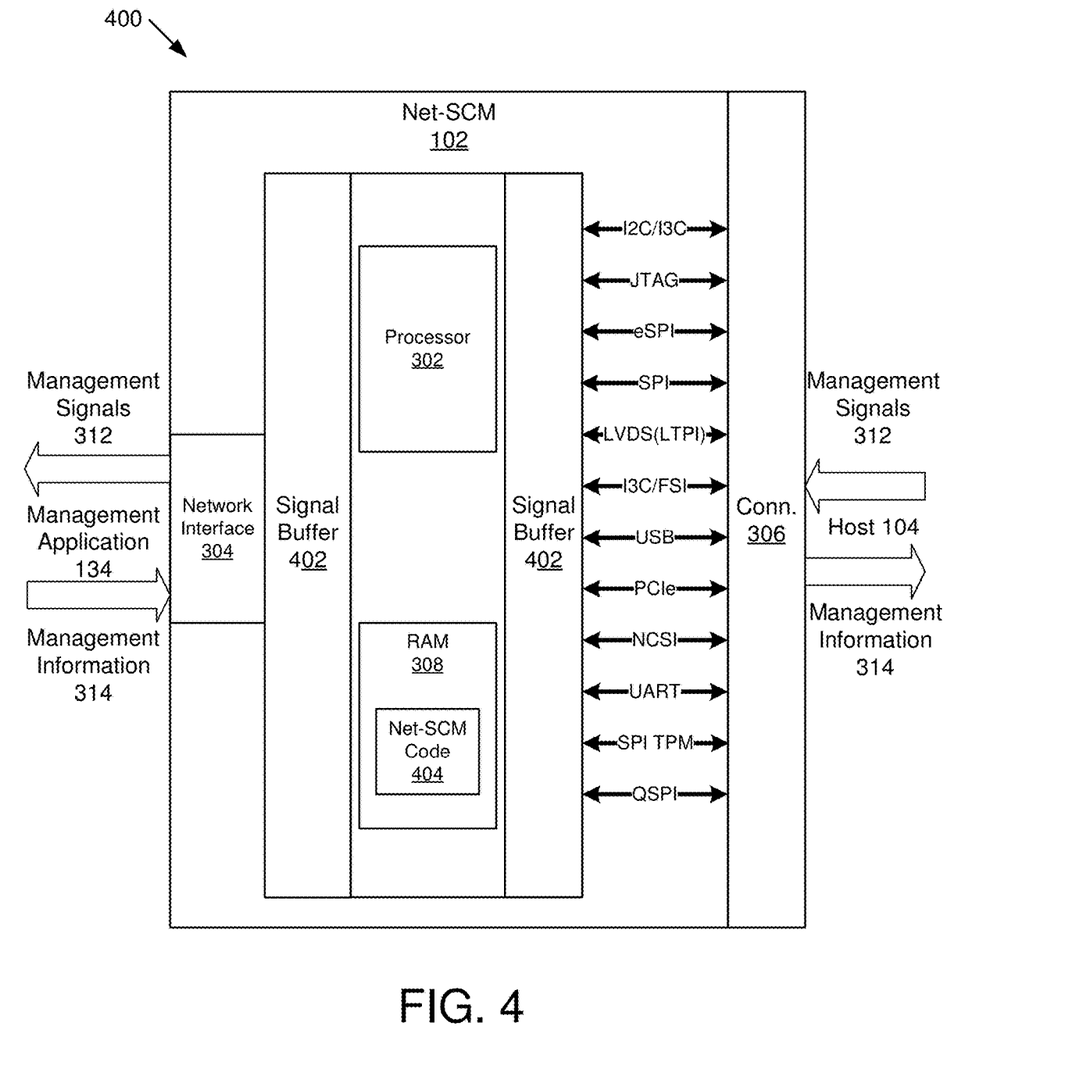
FIG. 4 is a schematic block diagram illustrating another secure control module for BMC platform offloading to a remote application, according to various embodiments.

FIG. 4 is a schematic block diagram illustrating another secure control module 400 for BMC platform offloading to a remote application, according to various embodiments. The secure control module 400 includes a Net-SCM 102 with a processor 302, a network interface 304, a connector 306, RAM 308, Net-SCM code 310, management signals 312, and management information 314, which are substantially similar to those above in the secure control module 400 of FIG. 4. The secure control module 400 of FIG. 4 also includes a signal buffer 402 and specific busses and connections, which are described below.

In some embodiments, the secure control module 400 includes one or more signal buffers 402 configured to buffer and/or queue the management signals 312 prior to transmitting the management signals 312 to the management application 134. In some embodiments, the signal buffers 402 receive the management signals 312 and store the management signals 312 until the management signals 312 are transmitted to the management application 134. In other embodiments, the signal buffers 402 queue the management signals 312 until the management signals 312 are transmitted to the management application 134. Queuing the management signals 312 includes storing the management signals 312 in a particular order.

The one or more signal buffers 402, in some embodiments, are configured to buffer the management information 314 and/or queue the management information 314 prior to transmitting the management information 314 to the host 104. In some embodiments, the signal buffers 402 receive the management information 314 and store the management information 314 until the management information 314 are transmitted to the host 104. In other embodiments, the signal buffers 402 queue the management information 314 until the management information 314 is transmitted to the host 104. Queuing the management information 314 includes storing the management information 314 in a particular order.

In some examples, the signal buffers 402 include one or more registers, memory, or other hardware devices designed to receive and hold signals prior to further processing. In some examples, the signal buffers 402 include or make use of the RAM 308, processor 302, or other hardware of the Net-SCM 102. The management signals 312, in some embodiments, are be received asynchronously over the various buses of the connector 306 and may overlap and the signal buffers 402 are configured with appropriate registers, buffers, memory, etc. to handle the various management signals 312. In some embodiments, the management signals 312 are digital signals. In other embodiments, one or more of the management signals 312 are analog signals. Where the management signals 312 are analog signals, the signal buffers 402 may include analog-to-digital converters.

In some embodiments, some or all of the management signals 312 are the same as for a DC-SCM. In some embodiments, some or all of the management signals 312 are the connections and busses depicted for the DC-SCM 202 of FIG. 2. In some embodiments, the connector 306 is customized to include connection and bus types that are customized for the host 104 and may include more or less connections and bus types than those depicted in the DC-SCM 202 of FIG. 2. One of skill in the art will recognize connections, signals, buses, etc. for the connector 306 of the Net-SCM 102.

Figure 5:
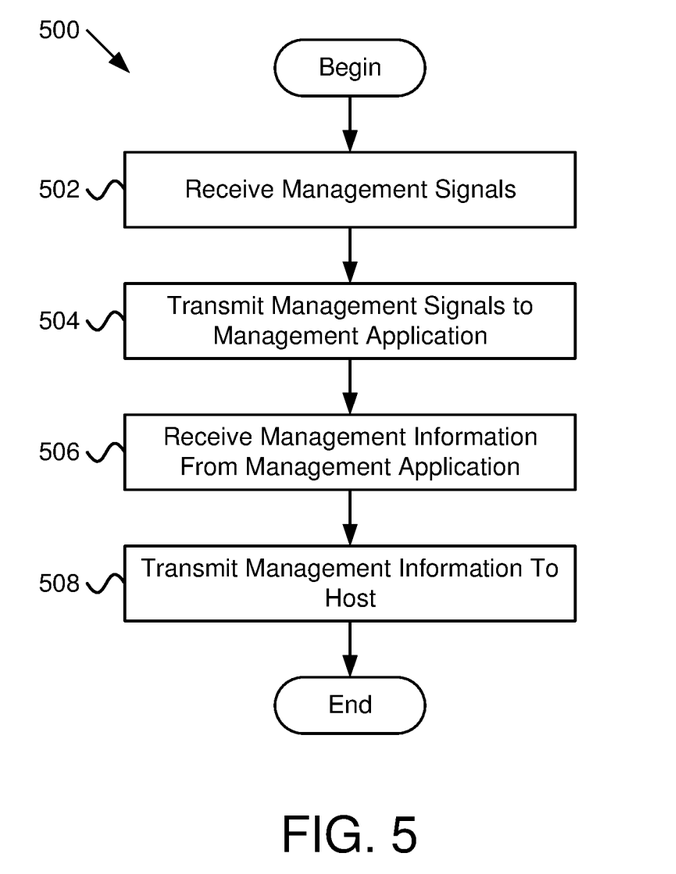
FIG. 5 is a schematic flow chart diagram illustrating a method for use of a secure control module for BMC platform offloading to a remote application, according to various embodiments.

FIG. 5 is a schematic flow chart diagram illustrating a method 500 for use of a secure control module for BMC platform offloading to a remote application, according to various embodiments. The method 500 begins and receives 502, at a connector 306, management signals 312. The connector 306 includes a plurality of data connections and the connector 306 is configured to connect to one or more data connections of a motherboard of a host 104. The method 500 transmits 504 the management signals 312 over a network interface 304 to a management application 134 running on a remote server 136.

The method 500 receives 506, over the network interface 304, management information 314 from the management application 134 where at least a portion of the management information 314 is in response to the management signals 312. The method 500 transmits 508 the management information 314 over the connector 306 to the host 104 on at least one of the one or more data connections, and the method 500 ends. In various embodiments, all or a portion of the method 500 is implemented with code stored on non-transitory computer readable storage media where the code is executable on a processor. In other embodiments, all or a portion of the method 500 is implemented using a Net-SCM 102 as described herein.

Figure 6:
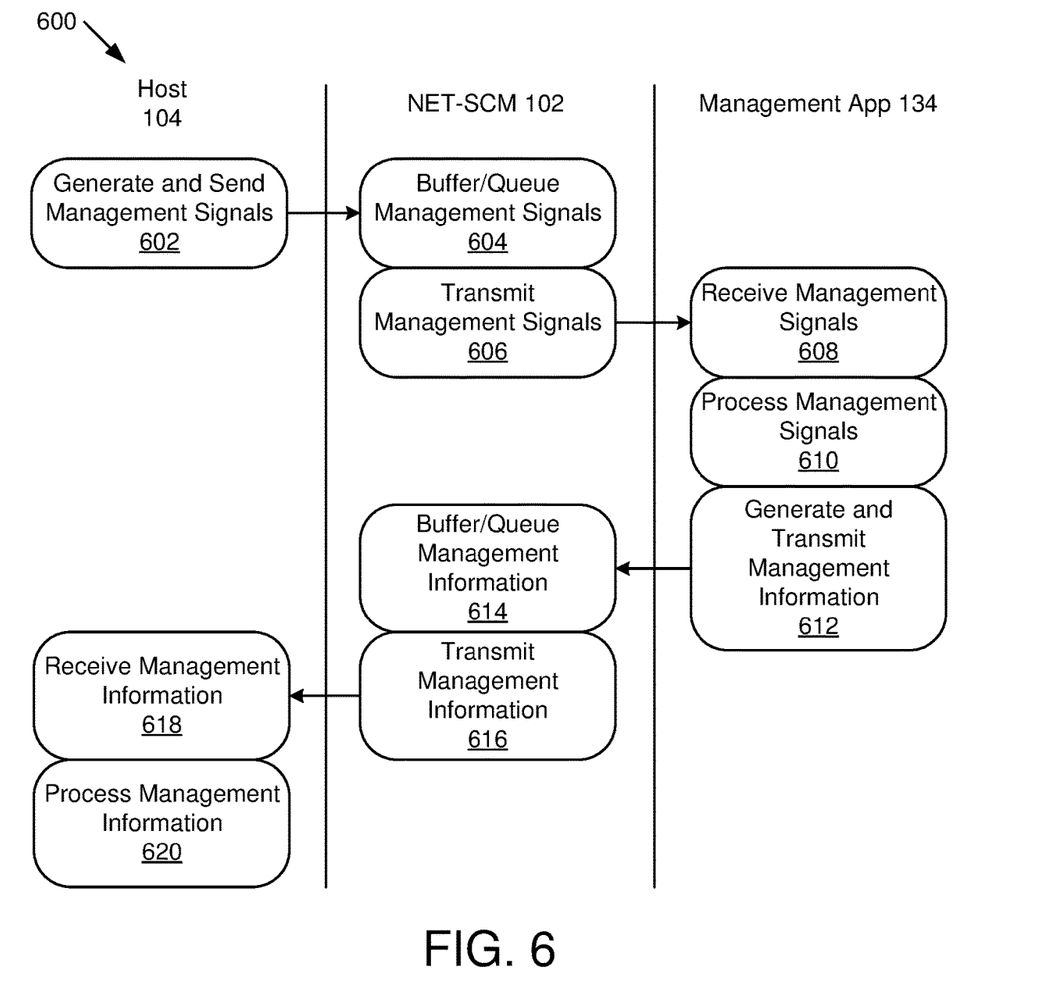
FIG. 6 is a process flow diagram illustrating a method for use of a secure control module for BMC platform offloading to a remote application, according to various embodiments.

FIG. 6 is a process flow diagram illustrating a method 600 for use of a secure control module for BMC platform offloading to a remote application, according to various embodiments. The method 600 starts and the host generates and sends 602 management signals 312 from the host 104 a Net-SCM 102 that buffers and/or queues 604 the management signals 312. The management signals 312 include data packets, signals, etc. from various components of the host 104 that are intended for a BMC or DC-SCM. The Net-SCM 102 transmits 606 the management signals 312 to a management application 134. The management application 134 receives 608 and processes 610 the management signals 312.

The management application 134 generates and transmits 612 management information 314 to the Net-SCM 102. The Net-SCM 102 buffers and/or queues 614 the management information 314 and transmits 616 the management information 314 to the host 104. The management information 314 includes commands, status information, etc. that is in response to the management signals 312. In some embodiments, the management information 314 is generated separate from management signals 312 and may include management information 314 generated in response to user commands, management functions, etc. The host 104 receives 618 the management information 314 and processes 620 the management information 314. Processing 620 the management information 314, in some embodiments, includes adjusting operation of the host 104, such as changing a speed of a fan 130, responding to a command, etc.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A secure control module comprising:
a processor;
a network interface;
a connector comprising a plurality of data connections, the connector configured to connect to one or more data connections of a motherboard of a host;
non-transitory computer readable storage media storing code, the code being executable by the processor to perform operations comprising:
receiving management signals from the connector, the management signals originating from components on the motherboard and comprising input related to controlling the host;
passing each of the management signals from the connector to the network interface;
transmitting each of the management signals over the network interface to a management application running on a remote server, wherein the management application on the remote server emulates one of a baseboard management controller ("BMC") and a Datacenter Secure Control Module ("DC-SCM") and processes each of the management signals, wherein analog management signals are digitized prior to transmission;
receiving, over the network interface, management information from the management application, wherein at least a portion of the management information is in response to the management signals;
passing each of the management information from the network interface to the connector; and
transmitting each of the management information over the connector to the host on at least one of the one or more data connections to the motherboard.

2. The secure control module of claim 1, wherein the connector is compliant with an industry standard specification for a BMC interface.

3. The secure control module of claim 2, wherein the connector is a Datacenter-ready Secure Control Interface ("DC-SCI") and wherein the DC-SCI is compliant with a DC-SCM specification.

4. The secure control module of claim 1, wherein the management signals comprise signals intended for a BMC.

5. The secure control module of claim 1, wherein the management signals are compliant with a DC-SCM specification.

6. The secure control module of claim 1, further comprising one or more signal buffers configured to:
buffer the management signals and/or queue the management signals prior to transmitting the management signals to the management application; and/or
buffer the management information and/or queue the management information prior to transmitting the management information to the host.

7. The secure control module of claim 1, wherein the management application comprises a Basic Input/Output System ("BIOS") image for the host and/or a BMC image and wherein, in response to management signals accessing the BIOS image and/or the BMC image, the operations further comprise receiving management information from the BIOS image and/or the BMC image and transmitting the management information to the host over the connector.

8. The secure control module of claim 1, wherein the one or more connections comprise one or more general-purpose input/output ("GPIO") connections, an inter-integrated circuit ("I²C" or "I2C") bus, a peripheral component interconnect express ("PCIe") bus, a serial peripheral interface ("SPI") bus, a universal serial bus ("USB"), a Joint Test Action Group ("JTAG") connection, an I3C bus, a network controller sideband interface ("NCSI") bus, and/or a universal asynchronous receiver-transmitter ("UART") connection.

9. The secure control module of claim 1, wherein the connector comprises the network interface.

10. The secure control module of claim 1, wherein the connector comprises:
a card slot;
printed circuit board ("PCB") traces; and/or
wired connections.

11. A method comprising:
receiving management signals at a connector, the connector comprising a plurality of data connections, the connector configured to connect to one or more data connections of a motherboard of a host, the management signals originating from components on the motherboard;
passing each of the management signals from the connector to a network interface;
transmitting each of the management signals over the network interface to a management application running on a remote server, wherein the management application on the remote server emulates one of a baseboard management controller ("BMC") and a Datacenter Secure Control Module ("DC-SCM") and processes each of the management signals, wherein analog management signals are digitized prior to transmission;
receiving, over the network interface, management information from the management application, wherein at least a portion of the management information is in response to the management signals;

passing each of the management information from the network interface to the connector; and transmitting each of the management information over the connector to the host on at least one of the one or more data connections to the motherboard.

12. The method of claim 11, wherein the management signals comprise signals intended for a BMC and wherein the management signals are compliant with an industry standard BMC interface specification.

13. The method of claim 11, further comprising:

buffering the management signals and/or queuing the management signals prior to transmitting the management signals to the management application; and/or buffering the management information and/or queuing the management information prior to transmitting the management information to the host.

14. The method of claim 11, wherein the management application comprises a Basic Input/Output System ("BIOS") image for the host and/or a BMC image and wherein, in response to management signals accessing the BIOS image and/or the BMC image, further comprising receiving management information from the BIOS image and/or the BMC image and transmitting the management information to the host over the connector.

15. A system comprising:

a host comprising a motherboard;

a secure control module comprising:
 a processor;
 a network interface;
 a connector on the motherboard comprising a plurality of data connections, the connector configured to connect to one or more data connections of the motherboard;
 non-transitory computer readable storage media storing code, the code being executable by the processor to perform operations comprising:
  receiving management signals from the connector, the management signals originating from components on the motherboard and comprising input related to controlling the host;
  passing the management signals from the connector to the network interface;
  transmitting each of the management signals over the network interface to a management application running on a remote server, wherein the management application on the remote server emulates one of a baseboard management controller ("BMC") and a Datacenter Secure Control Module ("DC-SCM") and processes each of the management signals, wherein analog management signals are digitized prior to transmission;
  receiving, over the network interface, management information from the management application, wherein at least a portion of the management information is in response to the management signals;
  passing each of the management information from the network interface to the connector; and
  transmitting each of the management information over the connector to the host on at least one of the one or more data connections to the motherboard.

16. The system of claim 15, wherein the management signals comprise signals intended for a BMC and wherein the management signals are compliant with a DC-SCM specification.

* * * * *